W. H. WAKFER.
FILE.
APPLICATION FILED JULY 14, 1911.
1,068,548.
Patented July 29, 1913.
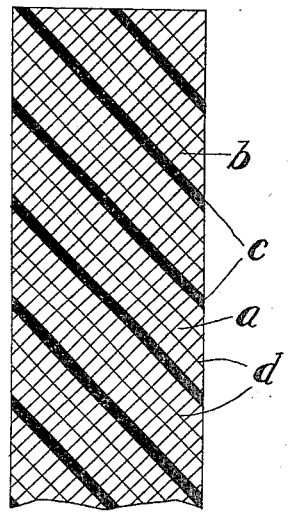
Fig: 1.
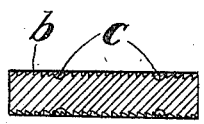
Fig: 2.
WITNESSES
Cornelius Hoving.
R R Appleton
INVENTOR
W.H. WAKFER
BY H van Oldenneel
ATTORNEY

UNITED STATES PATENT OFFICE.

WILLIAM HENRY WAKFER, OF SOUTH NORWOOD, ENGLAND, ASSIGNOR OF ONE-HALF TO SAMUEL PECK, OF CALBOURNE, WALLINGTON, ENGLAND.

FILE.

1,068,548.  Specification of Letters Patent.  Patented July 29, 1913.

Application filed July 14, 1911. Serial No. 638,524.

*To all whom it may concern:*

Be it known that I, WILLIAM HENRY WAKFER, subject of the King of Great Britain and Ireland, residing at 67 Whitworth road, South Norwood, in the county of Surrey, England, have invented new and useful Improvements in and Relating to Files, of which the following is a specification.

This invention relates to improvements in such files in which provision is made in the body of the file at intervals along its length of clearing grooves by which the filings removed by the teeth are enabled to be discharged from the face of the file in order that the surface of the work shall not be scratched or defaced by the presence of such filings; and has for its object the construction of such a file whereby the action of the file is insured against any deadening effect of the clogging of the teeth or grooves with collected filings, and the cutting efficiency of the file is considerably increased with less labor in using the file as compared with files of known construction.

To carry the invention into effect I arrange the teeth proper of the file parallel to one another and in one direction only and at an angle to the body of the file of from 35° to 45° in order to produce a shearing cut. At suitable intervals preferably along the whole length of the file, in a direction transverse and at an opposite angle to the teeth of the file, I arrange channels or grooves which are preferably deeper than the teeth of the file so that such channels afford a free exit for the filings along the stroke of the file, and at the same time effect the special cutting action hereinafter explained.

The channels or grooves can be of any convenient form, but are preferably made with a more or less rounded formation at the bottom of the channels or grooves so as to maintain the maximum strength of the body of the file to its utmost extent and at the same time afford a considerable amount of clearance for the filings. These channels or grooves can be produced in any convenient manner, either initially in the production of the file blanks by rolling, cold pressing, stamping, milling or otherwise; or the channels or grooves may be made after the file teeth have been cut (if preferred). These channels or grooves, besides affording means of clearance for the filings, at the same time considerably enhance the cutting capacity of the file, without entailing any extra labor, owing to the presentation to the work of a series of saw-like cutting edges; each of such edges picking up a fresh grip of the work for its own tooth throughout the whole length of the stroke of the file and such grip is continued as a shearing cut throughout the length of the shearing edge of each tooth thereby considerably prolonging the usefulness of the file, it being indisputable that a shearing tool stands considerably more wear and tear than a milling or scraping tool. These channels or grooves practically dispense with the necessity for any double cutting, and at the same time effectually neutralize any tendency for lateral movement of the file, due to the angular nature of the teeth, which is counteracted by the cutting effect of the saw-like part of the teeth, produced by the channels or grooves, but if required for very dense cuts intermediate saw-like edges in alinement with the channels or grooves may be provided and these would preferably be procured in the same operation as the channels or grooves.

The channels or grooves may be in any suitable spacing regulated in accordance with the different widths or types of file so as to enhance the cutting capacity of each type or form of file and at the same time insure an equipoise in effect, in whatever type or pitch of teeth may be engaged or employed. The particular angular arrangement of the teeth and grooves toward each other enables the file to be used along or across the smallest superficial surface without any tendency to kick or chatter as in the case of the employment of more obtuse angles for the disposition of the teeth and grooves.

In order that the invention may be the better understood I will now proceed to describe the same in relation to the accompanying drawing reference being had to the letters marked thereon.

Figure 1 is a plan view of a portion of a file illustrating my invention, and Fig. 2 is a cross sectional view thereof.

To carry the invention into effect as shown in the drawing upon the body $a$ of the file teeth $b$ are cut at an angle of from 35° to 45° to the body $a$ and transverse to said teeth $b$ clearance channels or grooves $c$ are provided at an opposite angle so that the filings removed from the work by each serial set of teeth *b* are collected in the adjoining clearance channels or grooves *c* and owing to the particular angular position of each channel or groove relative to the body of the file the said filings cannot become embedded in or retained by the following series of saw-like edges of the teeth, but are freely discharged sideward, clear of the teeth, thus leaving the teeth *b* free to take a fresh hold of the work without any hindrance from filings previously removed.

A set of secondary teeth edges *d* can be cut parallel to the grooves *c*.

I claim—

1. A file having a series of shearing teeth parallel to one another and extending in one direction only and at an angle of 35° to 45° to the body of the file, and a series of clearance channels or grooves disposed across the teeth of the file at an opposite angle so as to collect the filings, discharge them laterally, and at the same time present teeth edges to take an initial grip of the work and balance the shearing action, substantially as described.

2. A file having a series of shearing teeth parallel to one another and extending in one direction only and at an angle of 38° to 45° to the body of the file, a series of clearance channels or grooves disposed across the teeth of the file at an opposite angle so as to collect the filings, discharge them laterally, and at the same time present teeth edges to take an initial grip of the work and balance the shearing action, and intermediate saw-like teeth edges in alinement with the teeth edges produced by the channels or grooves, substantially as described.

In testimony whereof I have signed my name to this specification in the presence of two subscribing witnesses.

WILLIAM HENRY WAKFER.

Witnesses:
   DORIS H. HITCHCOCK,
   CHARLES S. R. BULLOUGH.

---

Copies of this patent may be obtained for five cents each, by addressing the "Commissioner of Patents, Washington, D. C."